March 12, 1957      W. KIRK, JR      2,785,090
FABRIC COATED WITH POLY-*p*-XYLENE
Filed Sept. 21, 1953
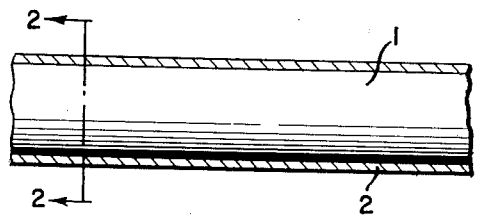
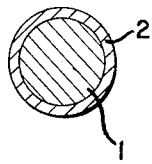
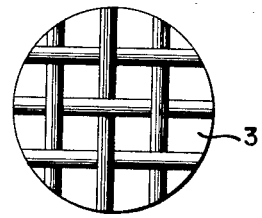
*INVENTOR*
WILLIAM KIRK, JR.
BY *Carl A. Hechmer*
*ATTORNEY*

United States Patent Office 2,785,090
Patented Mar. 12, 1957

2,785,090

FABRIC COATED WITH POLY-p-XYLENE

William Kirk, Jr., Wilmington, Del., assignor to E. I. du Pont de Nemours and Company, Wilmington, Del., a corporation of Delaware Application September 21, 1953, Serial No. 381,461

2 Claims. (Cl. 117—106)

This invention relates to a coated object and to a process for its production. More specifically, it relates to an object coated with a polymer possessing recurring units of the structure:

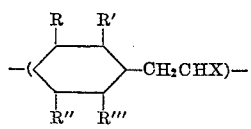

wherein R, R', R" and R'" are members of the class consisting of nuclear hydrogen, lower alkyl and halogen, and X is a member of the class consisting of hydrogen and halogen. The hexagon represents the benzene nucleus. Such a coating material will be referred to generically hereinafter as "a poly-p-xylene."

It is an object of the present invention to provide a novel coated structure.

Another object is to provide a structure having an external coating which renders it corrosion-resistant, electrically insulated, and water-resistant.

A further object is to provide a process for coating a structure which renders it corrosion-resistant, electrically insulated, and water-resistant.

A still further object is to provide novel filter media.

These and other objects will become apparent in the course of the following description and claims.

The coatings are produced by subjecting the structure to be coated to an atmosphere of pyrolyzed gases of a p-xylene, substituted p-xylene or a mixture of such materials at a temperature below about 80° C., and preferably below about 50° C. Polymerization occurs directly upon the exposed structure to produce a smooth, even coating.

The invention will be more readily understood by reference to the drawing.

Figure 1 is a sectional elevation along the length of a fiber 1, bearing a coating of poly-p-xylene 2.

Figure 2 is an elevation along line 2—2 of Figure 1, with a coating of poly-p-xylene 2.

Figure 3 is an enlarged view of a section of fabric bearing a coating of poly-p-xylene and illustrating the fact that the interstices 3 of the fabric are free as stated in Example II hereunder.

The following examples are cited to illustrate the invention. They are not intended to limit it in any way.

*Example I*

Liquid p-xylene is vaporized at 70° C. under reduced pressure. The vapor is introduced at a pressure of 3.6 mm. into a 15" x 1.38" quartz tube packed with small pieces of quartz tubing. The pyrolysis tube is maintained at a temperature of about 975° C. The flow is controlled so that about 60 grams of monomer are consumed per hour. The pyrolyzed gas is then passed into a coating chamber maintained at about room temperature. Excess vapors are led into a monomer recovery unit which is maintained at the temperature of a Dry Ice-acetone bath. p-Xylene is condensed out and is available for recycling.

The gas is impinged for about twenty minutes upon a wire gauze suspended in the coating chamber. At the end of this time, the wire is coated with a smooth, tough, uniform, transparent coating. However, the interstices remain open to permit the passage of gases and liquids. The coated screen is useful as a filter for corrosion materials.

*Example II*

The stainless steel gauze of Example I is replaced with a swatch of cellulose acetate fabric and the process of Example I repeated. The cellulose acetate fibers were not swollen when the fabric was immersed in acetone. This is evidence of the impervious nature of the coating obtained on all of the filaments. However, the interstices of the fabric are still free, and the fabric is useful as a filter cloth. Such filter cloths have particular application in the handling of corrosive liquids and vapors.

*Example III*

The cellulose acetate fabric of Example II is replaced with a piece of copper wire and the process of Example I repeated. The copper wire is observed to acquire a thin transparent coating which is difficult to strip. The wire can be flexed repeatedly without breaking, damaging, or disengaging the film. The process is readily adapted to coat wire continuously.

*Example IV*

The apparatus employed in Example I is modified by replacing the coating chamber with a chimney. Pyrolyzed vapors, as produced in Example I, are led into the bottom of the chimney and escape at the top. Talc is dropped into the top of the chimney and is recovered at its base. It is observed by microscopic examination that the particles of talc so treated have a thin, transparent coating. The material has special use as a filter media for corrosive liquids.

*Example V*

The apparatus of Example IV is employed to coat titanium dioxide with the polymer produced from the pyrolyzed vapors of pseudocumene. The articles are contacted for a period of approximately ten minutes. The coated particles have special use as a delustering agent for fibers and filaments.

*Example VI*

The apparatus of Example I is modified so that the pyrolyzed gases are caused to impinge upon all exposed surfaces of a steel barrel. p-Xylene dichloride is vaporized at a temperature of 140° C. and pyrolyzed at 760° C. under a pressure of 2.5 mm. at a rate of approximately 50 grams per hour. After 10–15 minutes the barrel is observed to have a tough, transparent, shiny coating. At room temperature, this coating is impervious to all known solvents and is not affected by either acid or alkali. The coated barrel is particularly useful for transferring corrosive liquids.

To obtain a satisfactory coating which will withstand mechanical stress, the coating must be applied so as to completely cover the external surface of the object. While applicant does not wish to be bound by any theory in this regard it is hypothesized that this is accomplished by virtue of the fact that the monomer stream is condensed on the surface to be coated, completely covering the object because of the ready mobility of the monomer, and that polymerization then takes place spontaneously in situ. The strength of the bond does not appear to be affected by the nature of the surface coated. Furthermore the coating follows the most devious and intricate patterns of exposed surfaces as is evidenced by the examples. Thus the fibers of a cellulose acetate fabric are so completely covered that they are no longer swellable by acetone, yet the interstices of the fabric remain open. So also comminuted solids are completely and individually coated.

As is pointed out above, the coated articles of the invention find particular utility as filter media. However they may be used in many other rolls, such as in complex electronic circuits where a fine insulation is desired after assembly, in the production of corrosion resistant fabric for industrial garments and the like.

Many other modifications will be apparent to those skilled in the art from a reading of the foregoing without departure from the inventive concept.

What is claimed is:

1. A fabric having its surface completely coated with a poly-p-xylene, the said poly-p-xylene having been applied by subjecting the said fabric to an atmosphere of pyrolyzed gases from the class consisting of a p-xylene, substituted p-xylene and mixtures thereof, the said atmosphere being maintained at a temperature below about 80° C.

2. The structure of claim 1 wherein the said fabric is produced from cellulose acetate.

References Cited in the file of this patent

UNITED STATES PATENTS

| | | |
|---|---|---|
| 1,547,513 | Morden | July 28, 1925 |
| 1,818,155 | Ogleshby et al. | Aug. 11, 1931 |
| 1,978,034 | Sutherland | Oct. 23, 1934 |

FOREIGN PATENTS

| | | |
|---|---|---|
| 650,947 | Great Britain | Nov. 7, 1951 |